United States Patent [19]

Wiley et al.

[11] Patent Number: 5,135,411
[45] Date of Patent: Aug. 4, 1992

[54] MULTIPLE OUTLET RECEPTACLE AND MOUNTINGS THEREFOR

[75] Inventors: Roy O. Wiley, Huntington; Donald L. Meath, Shelton; Glenn L. Murphy, Oxford, all of Conn.

[73] Assignee: Hubbell Incorporated, Orange, Conn.

[21] Appl. No.: 503,510

[22] Filed: Apr. 2, 1990

Related U.S. Application Data

[63] Continuation of Ser. No. 340,198, Apr. 19, 1989, Pat. No. 4,978,318.

[51] Int. Cl.⁵ .................................... H01R 27/02
[52] U.S. Cl. .................. 439/535; 439/469; 439/536
[58] Field of Search ............... 439/535–538, 439/650, 652, 654, 469; 220/3.7; 174/54, 57

[56] References Cited

U.S. PATENT DOCUMENTS

| | | | |
|---|---|---|---|
| 4,082,915 | 4/1978 | Silver | 174/65 R |
| 4,583,799 | 4/1986 | Wiley | 439/106 |
| 4,591,656 | 5/1986 | Mohr | 174/57 |
| 4,632,491 | 12/1986 | Lutz | 439/650 |
| 4,775,122 | 10/1988 | McClymont | 174/65 R |
| 4,812,130 | 3/1989 | Altenschulte et al. | 439/84 |
| 4,818,822 | 4/1989 | Yahraus | 174/53 |
| 4,837,406 | 6/1989 | Emmons | 439/535 |
| 4,842,155 | 6/1989 | Begin, Jr. | 220/3.6 |

FOREIGN PATENT DOCUMENTS

673907  6/1952  United Kingdom ........... 439/809

OTHER PUBLICATIONS

Union Box Non-Metallic Boxes and Fittings.

*Primary Examiner*—Gary F. Paumen
*Attorney, Agent, or Firm*—Jerry M. Presson; Alfred N. Goodman

[57] ABSTRACT

A wiring device of the type which by itself is configured for surface mounting is made more universally mountable by an adapter plate to which the device may be joined and the adapter plate joined to any of a number of different outlet box configurations. In addition and alternatively, a wiring device so described may be further utilized with a portable box on which it is mounted, which portable box has sidewalls with cord openings communicating to the device. All such configurations are designed for compactness and shallowness from a front face which may provide a plurality of outlet openings. In addition, the wiring device of the present invention utilizes a snub hole wiring termination configuration that facilitates installation.

6 Claims, 6 Drawing Sheets

MULTIPLE OUTLET RECEPTACLE AND MOUNTINGS THEREFOR

This is a continuation of U.S. patent application Ser. No. 07/340,198, filed Apr. 19, 1989, now U.S. Pat. No. 4,978,318, issued Dec. 18, 1990.

BACKGROUND AND SUMMARY OF THE INVENTION

This invention relates to electrical wiring devices and particularly to unitary receptacles having multiple outlets and to mounting arrangements for such receptacles.

In Wiley U.S. Pat. No. 4,583,799, Apr. 22, 1986, there was presented a multiple outlet receptacle of which a specific embodiment disclosed has four outlets to permit four electrical appliances to be plugged in at one receptacle location. The receptacle may be used, for example, for office lighting applications where it would normally be installed in a ceiling recess fixture, such as an outlet box or concrete ring, or some other surface mounting. The receptacle is designed to have a shallow body of molded insulating material with an integral mounting flange at the rear edges of the body. Internal contact elements of the four outlets are located within the housing portion of the body and the front face has plug blade receiving apertures for communicating with the internal contact elements. A rear closing plate of insulating material is configured to fit within the back edge of the housing portion substantially flush with the mounting flange and provides a substantially planar rear surface for the entire unit.

In the exemplary receptacle of the patent, the internal contacts extend forwardly from first and second conductive plates that rest within the housing. A first conductive plate is configured as a ring and is located near the periphery of the unit while the second conductive plate is configured to fit within the aperture of the first plate and can be made from the same piece of starting material as the first plate. Each plate supports a contact element for each of the four receptacles that is aligned with a plug aperture in the front face. For a grounding receptacle, a third group of internal contact elements is included that is attached to a third conductive plate that is located on the outside, rearward, surface of the closing plate and extends through apertures within the closing plate.

The description of receptacles of the aforementioned patent is incorporated herein by reference. Such receptacles have been successful in providing compact, reliable, attractive, and easy-to-use multiple outlet receptacles, particularly in a surface mounting arrangement.

While not limited in all respects to the same exact form of receptacle as aforementioned but taking such a multiple outlet receptacle as an example, the present invention has objectives which include further variations for mounting such receptacles and particularly in embodiments which permit the flush mounting of such a receptacle, as opposed to merely surface mounting, either with a conventional outlet box or a new portable box also included as part of the present invention.

By achieving a flush mounted arrangement for an outlet box it is possible to provide such a receptacle for general household as well as commercial use in situations where otherwise cumbersome cube taps and the like have been commonly used. One such situation would be that for a television set, video cassette recorder, and a lamp, all at a common location.

One aspect of the present invention is a wiring device adapter plate that is for mounting an electrical wiring device such as a multiple outlet receptacle with an electrical outlet box. The wiring device is, generally, one having contact elements within a housing of molded insulating material that is otherwise separately usable for mounting on a surface. The adapter plate comprises a major plate portion and a rim extending around the periphery of the major plate portion and extending forward therefrom, providing a shallow recess for accommodating and matching in lateral extent a wiring device with which the adapter plate is to be used. The rim, for example, may just accommodate a flange of a multiple outlet receptacle as illustrated in the aforementioned Wiley patent and may further have an extent from front to back substantially matching that of the edge of the flange with which it is matched.

The adapter plate also includes means for facilitating the fastening of the wiring device to the adapter plate. This means may, for example, be a pair of fastener bosses, integrally molded with the rest of the plate and diagonally disposed thereon, that include fastener apertures. The adapter plate also includes means for facilitating the fastening of the adapter plate to an electrical outlet box or the like. The latter means includes fastener apertures variously located so as to permit mounting to one or more different types of electrical outlet boxes. For example, in accordance with an embodiment of the invention, the fastener apertures, provided as the means for facilitating the fastening of the adapter plate to and electrical outlet box, include apertures located for facilitating the fastening of the adapter plate to a single gang outlet box while other fastener apertures are located for facilitating the fastening of the adapter plate to a two-gang electrical outlet box of a first configuration as well as apertures for facilitating the fastening of the adapter plate to a two-gang electrical outlet box of an alternative configuration.

The major plate portion of the adapter plate has an opening therein configured to allow wiring from an outlet box to extend through the adapter plate to a wiring device when used therewith. The opening for the wiring may be, in one example, a substantially rectangular opening with a rearward extending guide wall that fits within and facilitates the location of the adapter plate with a single-gang outlet box.

Fastener bosses on the major plate portion of the adapter plate, whether for use in facilitating fastening of a wiring device to the adapter plate or for facilitating fastening of the adapter plate to an outlet box, are provided that extend upwardly from the major plate portion to a common height less than that of the rim of the adapter plate. Such fastener bosses are configured to support, in use of the adapter plate, a wiring device used therewith and, particularly, in one form of the invention, to achieve a substantially flush relationship of the mounting flange of a wiring device, as described above, with the rim surface.

A further aspect of the invention relates to a wiring device portable box for use with an electrical wiring device of the type having contact elements within a housing of molded insulating material otherwise separately usable for mounting on a surface. The portable box comprises a back and sidewalls upstanding from the back and defining a substantially rectangular box with an open front, all of molded insulating material. At least one opening is provided within the sidewalls for use as a cord passage and the portable box further includes means for facilitating the fastening of the wiring device to the portable box, such as a pair of diagonally disposed fastener bosses having fastener apertures.

The cord passages preferably include a pair of openings each having internally adjacent cord grip configurations integrally molded with the back and sidewalls of the box. Each of the cord grip configurations preferably comprises a partial cylindrical surface extending from the opening into the box for accommodating a cord in an orientation substantially parallel to the box back and a front edge at the inner end of the partial cylindrical surface extending upwardly therefrom. Additionally, the box comprises for each of the cord grip configurations, an upper clamp of separately molded insulating material that is secured thereto for retention of the cord therein against the front edge.

In one form the sidewalls of the portable box are configured to support the lateral edge of the wiring device without appreciable overlap.

Alternatively, the portable box may be configured so that the sidewalls accommodate the wiring device and that the wiring device is supported in a manner such as on fastener bosses, all similarly to that described above with respect to the adapter plate, so that a substantially flush mounting of the wiring device within the portable box may also be achieved in those instances where the wiring device includes a mounting flange. Where the wiring device does not include a mounting flange, a recessed orientation may still be desirable and may be accomplished consistent with the general aspects of the present invention. The portable box is provided with one or more openings in the back thereof for optional use in fastening of the box to an underlying support.

In accordance with another aspect of the invention the wiring device itself, namely a multiple outlet receptacle generally in accordance with the above-mentioned Wiley patent, is modified and improved by having contact elements attached to the respective conductive plates by being staked thereto, avoiding the necessity of riveting or the like as used heretofore, and also by having terminals on the back surface of the device for wiring connections that are symmetrically disposed about the center point of the back surface of the device for facilitating wiring thereto.

Additionally, a wiring device in accordance with the present invention, whether a multiple outlet receptacle or some other device is provided which comprises an insulating housing containing contact elements and having a number of wiring terminations accessible on the exterior of the housing, each of the wiring terminations comprising a screw terminal in a contact plate to which one or more of the contact elements are joined and, proximate to the screw terminal, an aperture through the contact plate for receiving a wire conductor, the plate aperture being located over a compartment within the housing bounded by one or more insulating walls integrally molded with the housing. This compartment is configured for slidably receiving a length of wire conductor to facilitate installation by use of a technique of inserting a conductor into the aperture and compartment and then wrapping a turn of the conductor around the screw terminal and tightening it. The compartment preferably has a cross-sectional dimension that is small relative to the depth of the compartment to help retain an inserted conductor therein. While such a wiring termination feature (which may be referred to as a "snub-hole" termination) is quite useful in relation to a multiple outlet receptacle of the type particularly described, it is not limited thereto.

Each of the foregoing features contribute to enhancing the flexibility of use of wiring devices, particularly multiple outlet receptacles, so that they can be applied in a greater variety of mounting arrangements with reliability and attractiveness.

DESCRIPTION OF THE PREFERRED EMBODIMENTS

Figure 1:
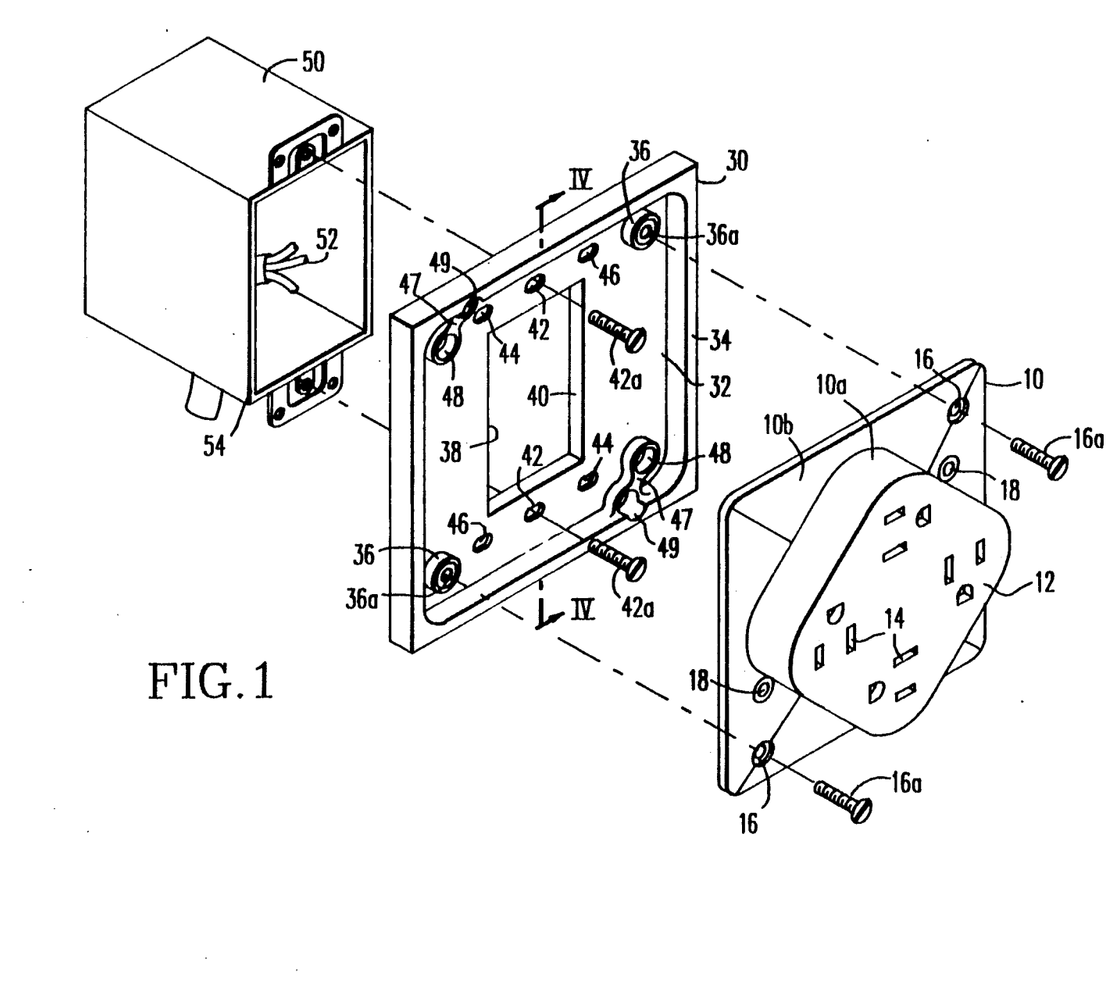
FIG. 1 is an exploded, perspective view of a wiring device, adapter plate, and an outlet box combination in accordance with one embodiment of the invention.

Referring to FIG. 1, a wiring device 10 is shown which is of the type having contact elements within a housing of molded insulating material. In this embodiment the wiring device 10 is a multiple outlet receptacle generally in accordance with the above-mentioned Wiley patent and further illustrated in FIGS. 7 through 9 herein which will be subsequently described. FIG. 1 shows the wiring device 10 in combination with a wiring device adapter plate 30 which is for mounting with an electrical outlet box of various types. A combination with one type of electrical outlet box 50, a conventional single gang outlet box for a duplex receptacle, is illustrated in FIG. 1.

In this embodiment the wiring device 10 has a shallow depth compared to its width and has a front face 12 in which the plug apertures 14 for all of the outlets appear. The front face 12 has an overall configuration that is substantially rectangular with rounded corners. Additionally, the wiring device 10 illustrated has extending from its contact housing 10a a mounting flange 10b integrally molded with the housing. The mounting flange 10b also has a substantially rectangular configuration with rounded corners. Other configurations for the wiring device 10, with or without a mounting flange, are suitable for use in the practice of the invention involving the use of a wiring device adapter plate 30 as shown. The wiring device 10 is one mountable by itself in certain configurations on a surface, such as by use of fasteners through apertures 16 in the illustrated flange 10b, now made more flexible and multifunctional by use of the adapter plate 30.

The adapter plate 30 has means for facilitating attachment of the wiring device 10 thereto which, in this embodiment, comprises fastener bosses 36 diagonally disposed therein extending from a major plate portion 32. The fastener bosses 36 have apertures 36a receptive of fasteners 16a that extend through the similarly oriented apertures 16 of the wiring device 10.

The adapter plate 30 as mentioned comprises a major plate portion 32 from which the fastener bosses 36 for mounting the wiring device 10 extend. The adapter plate 30 also has a rim 34 extending around its periphery and extending forward therefrom and providing a recess for accommodating and substantially matching in lateral extent a wiring device used with the adapter plate.

In this embodiment the rim 34 of the adapter plate 30 is intended to fit around the edge of the wiring device such as around the edge of the mounting flange 10b of the depicted device 10. In alternative embodiments it is suitable to have an adapter plate to which a wiring device is mounted on a surface, such as the rim surface, without being nested therein. In any of its configurations, the adapter plate 30 allows an ultimate combination in which the adapter plate holds the wiring device and there is a multiplicity of alternative means for fastening the adapter plate to a variety of outlet boxes or the like as will be further described.

Figure 4:
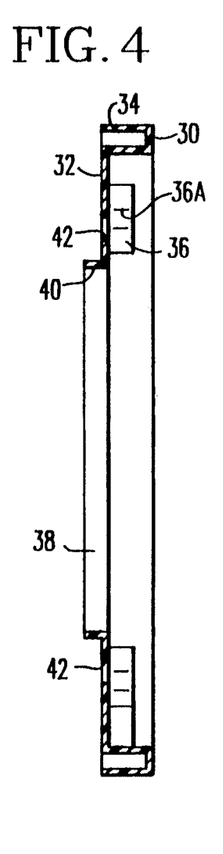
FIG. 4 is a sectional view of an adapter plate as shown in FIGS. 1 to 3 taken on a central plane such as IV—IV as shown in FIG. 1.

In this embodiment the adapter plate has a central aperture 38 of generally rectangular configuration which, as shown in FIG. 4, also has a rearwardly extending guide wall 40. The central aperture 38 is for permitting wires 52 from an outlet box 50 to extend through the adapter plate 30 to be joined with the wiring device 10 on its rear surface. The configuration of the aperture 38 and the presence of the rearward guide wall 40 are not critical but the configuration as shown helps generally locate the adapter plate 30 in combination with a single-gang outlet box 50 wherein the guide wall enters within the box edge 54. Also the guide wall 40 helps by providing smooth surfaces across which the conductors pass.

The adapter plate 30 of FIG. 1 has five different means for facilitating the attachment of the plate to an outlet box. Such means, in this example, comprise fastener apertures of certain locations, in pairs. A first pair of fastener apertures 42 are centrally located in the major plate portion 32 and match the configuration of the single-gang outlet box 50 for mounting a single duplex receptacle as shown in FIG. 1; screws 42a pass through apertures 42 into the corresponding apertures of the outlet box.

Figure 2:
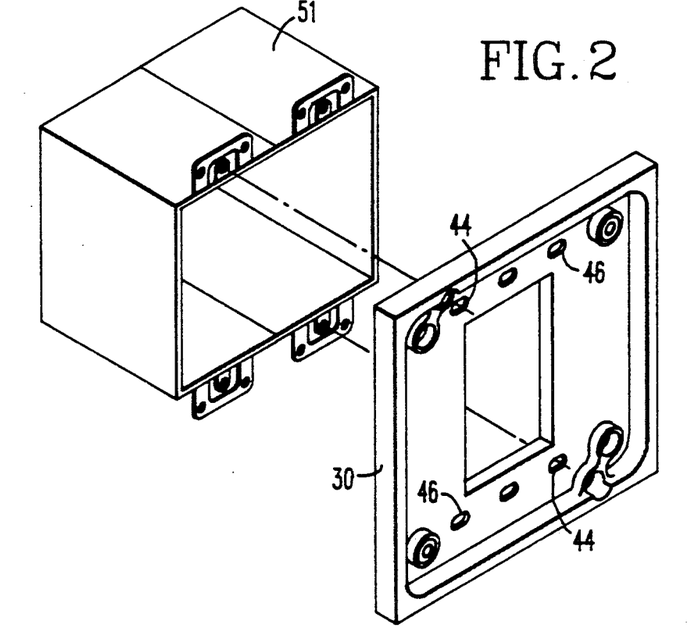
FIGS. 2 and 3 are exploded, perspective views illustrating alternative mounting arrangements with various outlet boxes of an adapter plate in accordance with an embodiment of the present invention.

The adapter plate 30 also includes a pair of apertures 44 within the major plate portion 32 diagonally disposed for facilitating the mounting of the plate a two-gang outlet box 51 as is illustrated in FIG. 2. Alternatively, an additional pair of fastener apertures 46 on the other diagonal as compared to the pair 44 are also useful for mounting to such a two-gang device; any or all four of apertures 44 and 46 may be used.

In the illustrated adapter plate 30 fastener bosses 47 in the upper left and lower right corners are provided in a configuration that allows two alternative pairs of fastener openings 48 and 49. A pair 48 inward from the rim 34 are oriented for use with a four-inch conventional outlet box. This particular form of outlet box is not illustrated in the drawing. Such an outlet box is also one to which the wiring device 10, can be directly mounted using its fastener apertures 16. Thus one sees that the adapter plate 30 not only allows mounting to different forms of outlet boxes than the wiring device itself may be mounted but also allows mounting to some of the same forms of outlet box configurations but with a different result in appearance, namely the achievement of a flush mounting as opposed to surface mounting.

Figure 3:
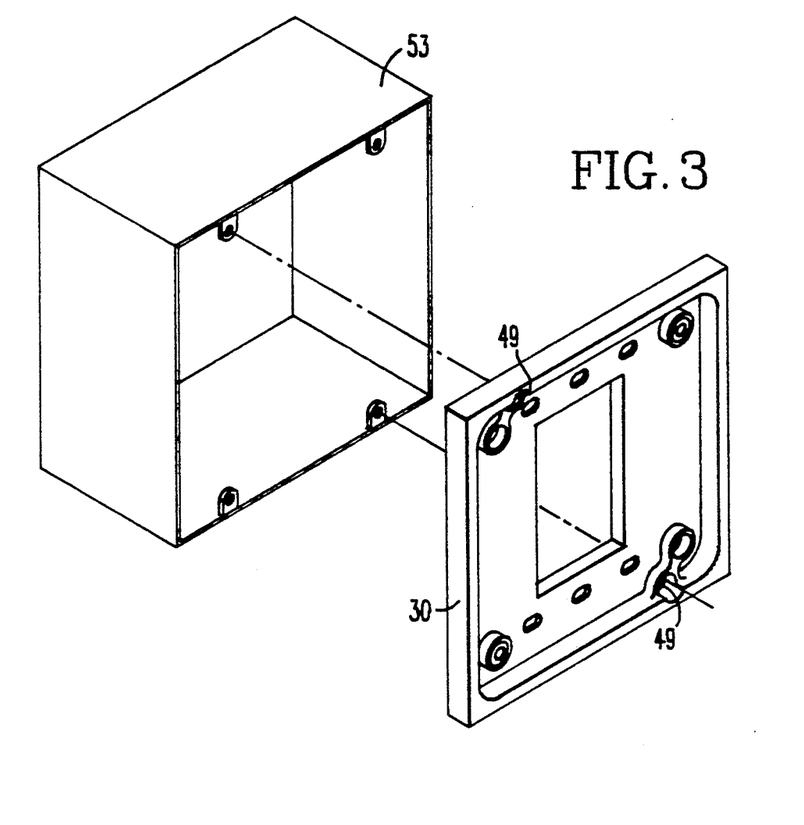

The plate portion 32 also has a pair of apertures 49 that extend partially within the rim 34 of the device and are used as shown in FIG. 3 for the type of outlet box 53 known in the trade as the 4-11/16 inches square outlet box, which has more common usage in Canada than in the United States. (The four inch box referred to in the preceding paragraph is similar to the box 53 but with somewhat different overall size and fastener location).

The fastener bosses 36 and 47 are all disposed with their front surfaces in and a common plane so that when the wiring device 10 is inserted within the recess afforded by the rim 34, those bosses support the device, in this case the flange 10b of the device, with the upper or front face of the flange substantially flush with the face of the rim.

It is further noted that the fastener bosses 47 include recesses about the apertures 48 and 49 such that the fasteners used to mount the plate to an outlet box are recessed away from the plane referred to on which the flange of the wiring device rests.

The adapter plate 30 may be configured with a plurality of different means for facilitating mounting of a wiring device so as to accommodate different wiring devices. That, is, if wiring devices become available with fastener apertures disposed in a somewhat different pattern than those of the illustrative embodiment, an adapter plate may be readily configured to permit mounting thereto.

It will be incidentally noted that the illustrated wiring device 10 has optional fastener openings 18 in locations that match those of a two-gang outlet box or an octagon ring.

Figure 5:
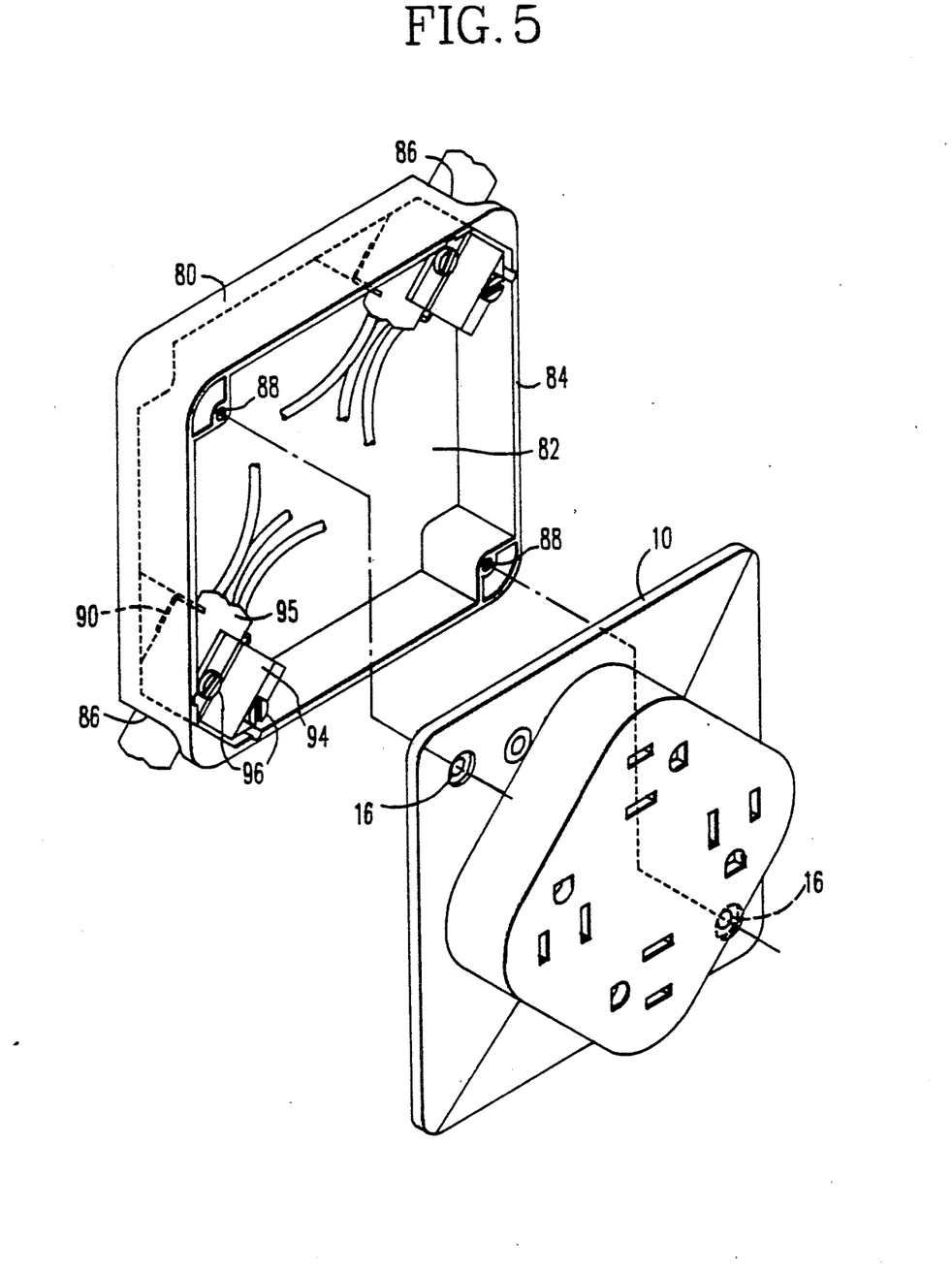
FIG. 5 is an exploded, perspective view of a wiring device and portable box combination in accordance with an embodiment of the present invention.

FIG. 5 illustrates a combination of a portable box 80 and a wiring device 10 in accordance with an embodiment of the present invention.

The portable box 80 herein is one specifically configured for use with an electrical wiring device 10 of the type illustrated having contact elements within a housing of molded insulating material and otherwise separately useful for mounting on a surface. The portable box 80 is configured for stand-alone use, i.e., not for mounting within a wall as is an outlet box. The portable box 80 (also see FIG. 6) has a back 82 and sidewalls 84 upstanding from the back and defining a box of molded insulating material with an open front. There is at least one opening 86 within the sidewalls 84 for use as a cord passage. In this embodiment there are two openings 86 in diagonally opposite corners of the portable box 80 for feed-through applications. The portable box 80 also has means for facilitating the fastening of the wiring device to the box. In this instance that means comprises fastener apertures 88 provided at opposing diagonal corners of the portable box 80 to mate with the fastener openings of the illustrative wiring device 10.

When only a single opening 86 is provided in the sidewalls 84 for use as a cord passage, the box 80 suffices to permit connection of the wiring device 10 to conductors without feedthrough. In the illustrative embodiment of FIG. 5, the two openings 86 allow wiring to the device with feedthrough.

Figure 6:
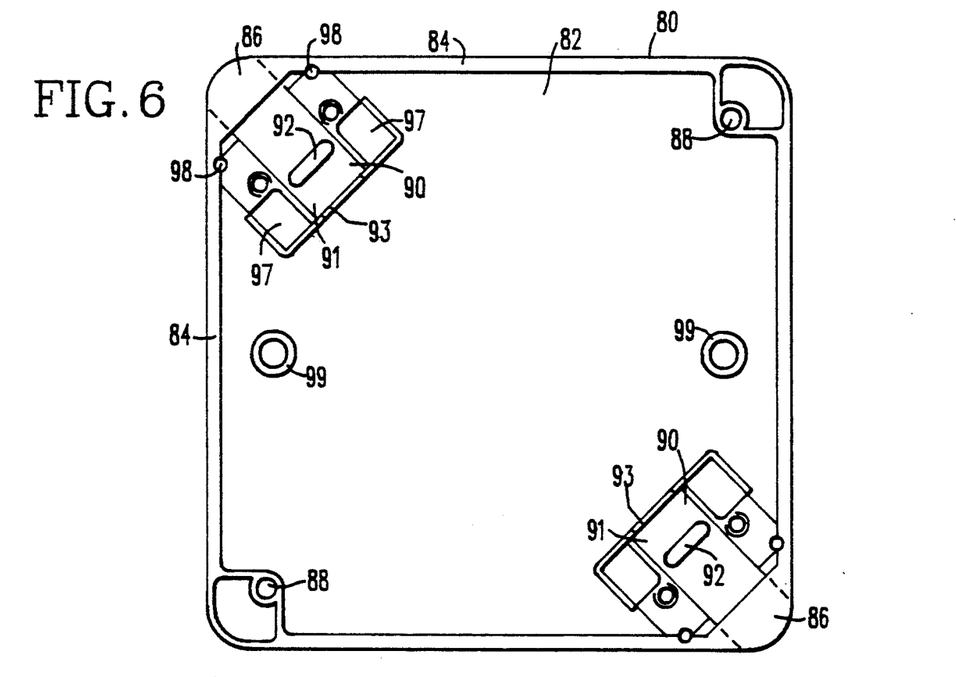
FIG. 6 is a plan view of a portable box of the type shown in the combination of FIG. 5.

The illustrative box 80 itself is further illustrated in FIG. 6. Each of the pair of openings 86 has an internally adjacent cord grip configuration 90 integrally molded with the back 82 and sidewalls 84. Each of the cord grip configurations 90 comprises a partial cylindrical surface 91 extending from the opening 86 into the box for accommodating a cord in an orientation substantially parallel to the box back. In this embodiment that surface has a rib 92 extending transversely across. There is also a front edge 93 at the inner end of the partial cylindrical surface 91 extending upwardly therefrom. In addition the box 80 comprises for each of the cord grip configurations 90 an upper clamp 94 (FIG. 5) of separately molded insulating material that is secured thereto for retention of a cord 95 therein against the front edge 93. The clamp 94 is engaged to the core grip 90 by fasteners 96. The upper clamp 94 fits within the front lip or edge 93. When a cord 95 is in place and the fasteners 96 are tightened, the clamp 94 bears down on the cord and holds it securely between the clamp and the front lip. The front of the clamp 94 and the front edge 93 may each have a partial arcuate portion that accommodates the cord 95.

In the embodiment shown the molding of the insulating material for box 80, such as a thermoplastic material, is facilitated by avoiding thick sections of material, hence the occurrence of the empty compartments 97 and apertures 98 or partial apertures that are merely intended to allow uniform and quick curing.

The portable box 80 may be configured with fastener apertures 99 in the back wall 82 for optional use in securing the box to another surface. When that is done, of course, the box 80 ceases to be portable, although it again becomes so if unfastened.

In the embodiment illustrated the device 10 sits on the edge of sidewalls 84 without overlap beyond the sidewalls. This is a preferred arrangement. It is also possible for the device 10 to extend within the sidewalls 84 in the manner of the rim 32 of the adapter plate 30, if desired. The configurations of the box 80 and device 10 may be other than the generally rectangular shapes shown, such as a more circular configuration or perhaps even an approximately triangular configuration.

The portable box 80 is readily distinguished in its characteristics from a conventional electrical outlet box used for wall installation. It is shallow to a marked extend having a lateral extent, such as diagonally across the illustrated embodiment, that is several times (e.g. at least about five times) greater than its depth. It serves as an electrically insulated shroud for the wiring joined to the wiring device 10 with which the box 80 is combined and allows portability in the use of that device while preserving safety and good appearance.

In the illustrated embodiment, the box 80 is so shallow that the cord opening 86 encompasses a substantial part, more than half, of the sidewall 84 in which it occurs. The portable box 80 shown is not intended for or configured for receiving within it common wiring devices such as a conventional wall switch or duplex receptacle. It is uniquely configured for use in association with wiring devices such as that illustrated that are otherwise surface-mountable, that is, by mounting in configurations not involving location within a conventional outlet box. In particular, the portable box 80 is most suitable for use with a shallow multi-outlet wiring device 10 as illustrated and one in which the edge of the wiring device, in this case the edge of the mounting flange 10b, closely matches the front of the portable box sidewalls 84.

Certain aspects of the wiring device 10 per se have been modified and improved in relation to that of the above-mentioned Wiley patent. These will now be described.

Figure 7:
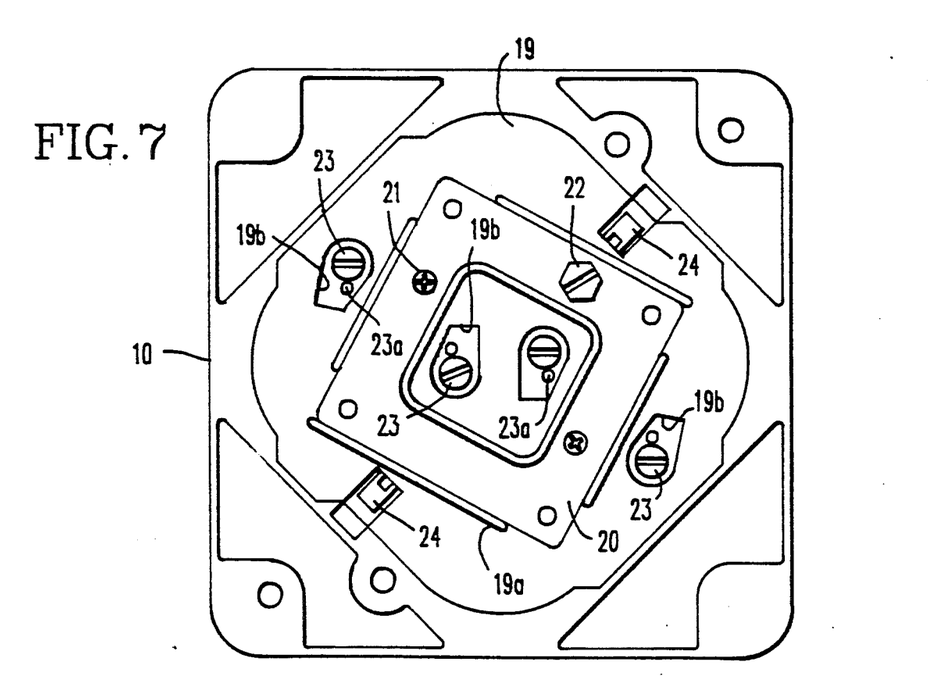
FIG. 7 is a rear plan view of a wiring device in accordance within an embodiment of the invention.

FIG. 7 shows a back view of the wiring device 10. In common with the previously patented device, a back insulating cover 19 fits within an opening of the main housing portion 10a and, when assembled, provides a substantially flush surface. Likewise in common with the previously patented device, a ground plate 20 is located on the exterior of the back cover 19, assisted by certain locator channels 19a of raised insulating material. Fasteners 21 extend through the grounding plate 20 and the back cover 19 into the interior of the device 10 which has fastener bosses (not shown) receptive of such fasteners. The grounding plate 20 has a grounding screw 22 for a ground wire connection.

Additionally, the back cover 19 has openings 19b accessing terminal screws 23 for connection to the internal contacts. Each terminal screw 23 is fastened to a contact plate of the device 10; a terminal screw 23 and adjacent contact plate portion are parts of a "screw terminal" for wiring connection or termination. Access is also provided to break-off tabs 24 are provided to allow the device to be used as two separate pairs of receptacles on separate circuits.

In contrast to the previously patented embodiment, the wiring terminal screws 23 are all located symmetrically about the center point of the back surface of the device 10 to simplify wiring connections. In addition, the terminal screws 23 associated with wiring terminations are of a novel and very efficient design involving a snub hole configuration which will be further described in detail subsequently in connection with FIGS. 8A and 9. In FIG. 7 it is seen that adjacent each of the terminal screws 23 is an aperture 23a through the contact plate to which the terminal screw is joined.

Figure 8A:
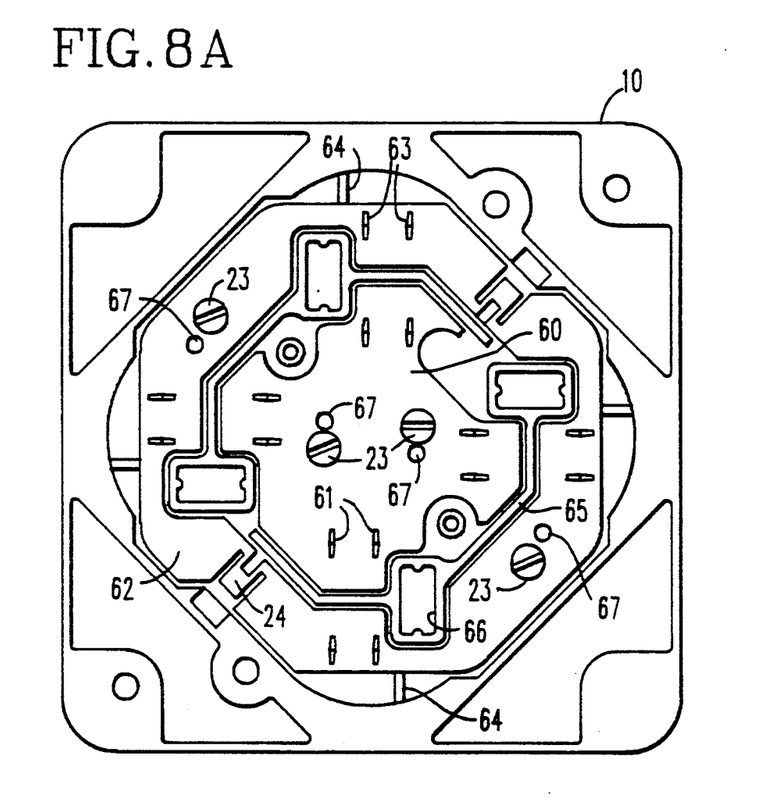
FIG. 8A is a view of the device of FIG. 7 with the back cover plate and ground contact plate of the device removed so as to view the inner contact plates.

In FIG. 8A certain features are shown that are common with the embodiment depicted in the aforementioned patent. The internal power contacts of the device are attached to contact plates that include a central plate 60 with a contact 61 for each of the four outlets, and a peripheral surrounding plate 62 with an additional contact 63 for each of the four outlets, the peripheral plate having the optional breakaway tabs 24. Each of the contacts 61 and 63 extends frontwardly from the plates 60 and 62 as shown in FIG. 8A, hence they are seen only by their staked joints to the plates in this view.

The contact plates 60 and 62 are coplanar as in the patented embodiment and they rest on insulating support walls 64 that occur in the molded housing 10a of which a limited part is apparent in this view. Further, a portion of an insulating housing wall 65 extends between the coplanar plates 60 and 62 and with it compartments 66 are illustrated through which the ground contacts attached to the ground plate 20, which has been removed in this figure, are accommodated.

Figure 8B:
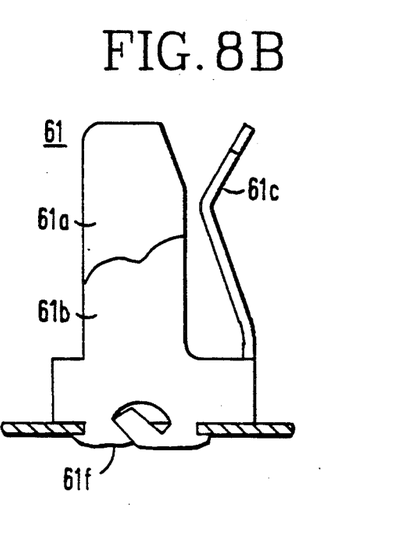
FIG. 8B is a side elevation view of part of the contact structure of FIG. 8A; and, FIG. 8C is a view of the elements of FIG. 8B at an interim stage of assembly.
Figure 8C:
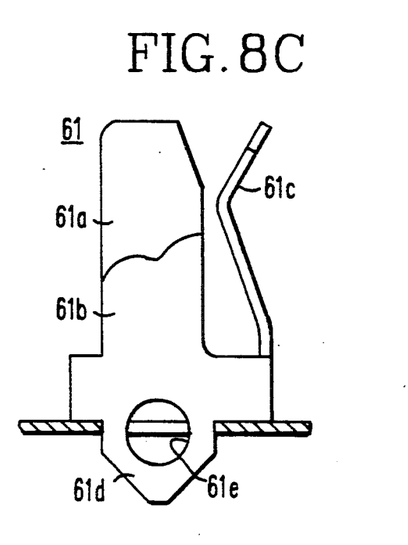

Among the differences from the embodiment of the former patent are that here the contact elements 61 and 63 are each attached to their respective contact plates by staking. In the embodiment of the patent conventional riveted contacts were used. In the present embodiment the staked contacts 61 and 63 are each an integral unit comprising, as shown in FIG. 8B, a pair of facing spring elements 61a and 61b through, which a plug blade passes, and also a third transverse spring element 61c. This configuration ensures tight reception and retention of the plug blades. By "staking" is meant the technique utilizing a tab on one piece that is inserted through an aperture of a second piece and then struck to deform the tab so it grips the underside of the second piece. Here each spring element 61a and 61b has a tab that extends through a hole in the FIG. 8C shows tab 61d inserted through the contact plate and not yet deformed. Tab 61d has an aperture 61e. In FIG. 8B, the plate tab has been struck (peened or swaged) to be deformed to the resulting configuration where portions 61F grip the plate.

Figure 9:
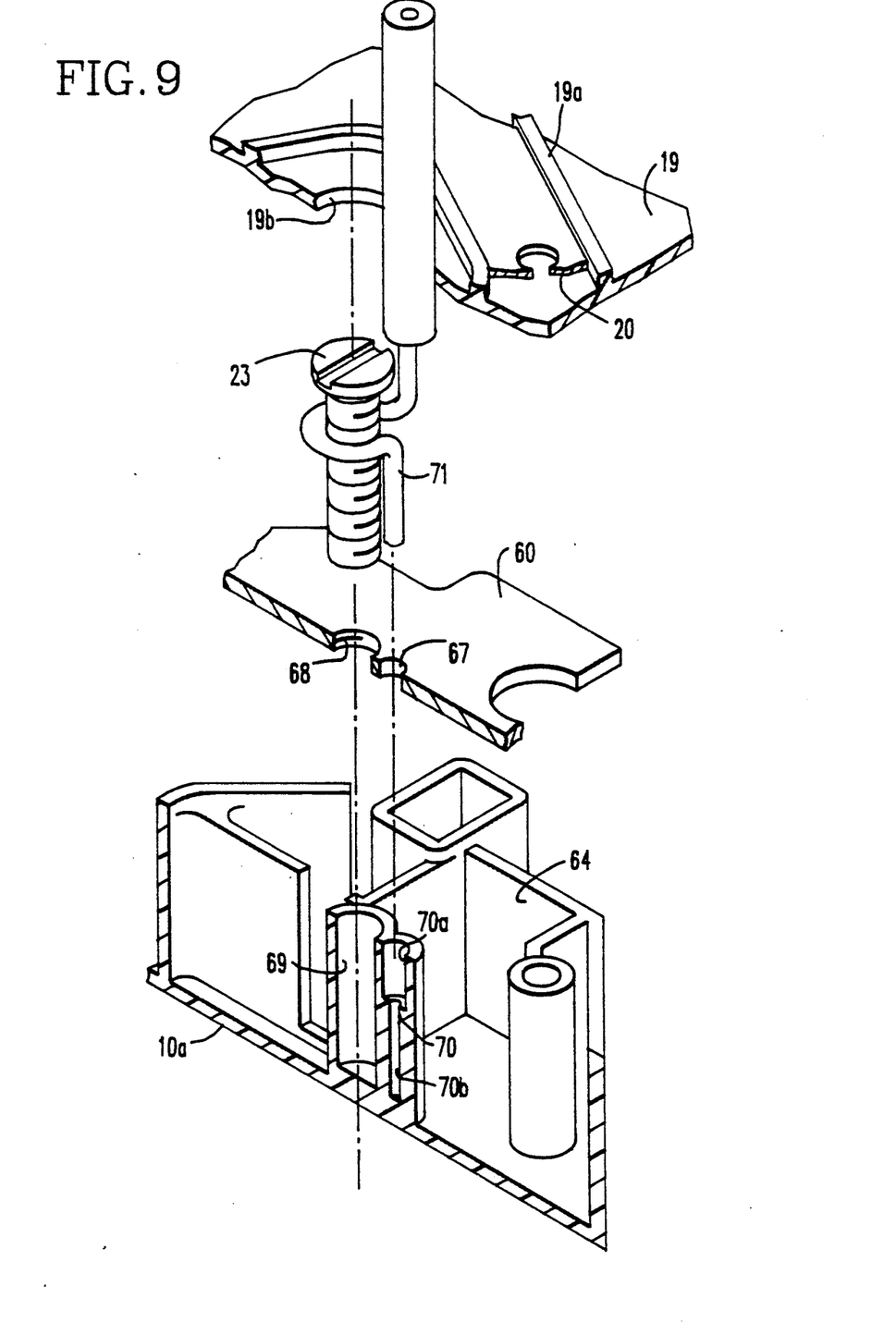
FIG. 9 is an exploded, perspective view of partial elements of a wiring device illustrating wiring terminations in accordance with an embodiment of the invention.

Furthermore, in the view of FIG. 8A are shown snub holes 67, through plates 60 and 62, adjacent to each of the terminal screws 23. Now with reference to FIG. 9 there will described the snub hole wiring termination technique as is used for each of the wiring terminations of the device 10. Illustrated in FIG. 9 is part of the back cover 19 and part of one of the contact plates such as the inner contact plate 60 which rests on insulating support walls 64 within the housing 10a as illustrated.

The terminal screw 23 itself extends through threads 68 in the contact plate 60 into a compartment 69 in the base 10a which is merely intended to accommodate, and avoid interference with, the screw. The contact plate snub hole 67 is aligned with a housing snub hole 70 which, in this example has an entrance portion 70a of a first diameter and an inner portion 70b that has a smaller diameter but is sufficient to accommodate wires to be used with the wiring device, such as numbers 14 or 16 stranded or solid, or number 12, solid.

The snub hole and mounting base configurations in association with the terminal screw 23 in the flat contact plate 60 is advantageous in allowing quick wiring by merely going through a simple procedure. The method is to first insert the end of a wire conductor 71 into the snub hole 67 and then compartment 70 as far as it will go, then wrapping the wire about the terminal screw 23 in a partial turn, as shown, and tightening the screw. The use of the snub hole 70 means that the wire remains reasonably secure while the wrapping of the partial turn about the screw terminal is performed and, of course, the tightening of the screw completes the connection. If desired for any purpose, more than a partial turn of wire about the screw may be performed.

The snub hole wiring technique as employed in the multi-outlet device depicted can be applied generally to wiring devices and is not limited to the specific embodiment or any embodiment as described herein. It is particularly suitable where a terminal screw is located in a flat contact plate supported on insulating walls of a housing.

It is therefore seen that a wiring device, such as a multiple outlet receptacle, can be made of improved design and with a variety of mounting configurations provided by the adapter plate and portable box described. Other modifications may be made in accordance with the general description herein.

What we claim is:

1. A wiring device portable box for use with an electrical wiring device of the type having contact elements within a housing of molded insulting material otherwise separately usable for mounting on a surface, which portable box comprises:
   a back and sidewalls upstanding from said back and defining a shallow box of molded insulating material with an open front;
   at least one opening within said sidewalls for use as a cord passage having a respective internally adjacent cord grip configuration integrally molded with said back and said sidewalls;
   said cord grip configuration comprises a partial cylindrical surface extending from said opening into said box for accommodating a cord in an orientation substantially parallel to said box back and a front edge at an inner end of said partial cylindrical surface extending upwardly therefrom;
   and, in addition, the box comprises for said cord grip configuration an upper clamp of separately molded insulting material that is secured thereto for retention of a cord therein against said front edge;
   means for facilitating the fastening of the wiring device to the portable box comprising a pair of oppositely disposed fastener bosses, said sidewalls being configured to support a major extent of a total peripheral edge of the wiring device to be used therewith, without appreciable overlap; and
   the box has a lateral extent at least about five times greater than its depth.

2. A wiring device portable box in accordance with claim 1 wherein:
   the portable box is adapted for use with a wiring device that is a receptacle having four outlets in a shallow insulating housing.

3. A wiring device portable box for use with an electrical wiring device of the type having contact elements within a housing of molded insulating material otherwise separately usable for mounting on a surface, which portable box comprises:
   a back and sidewalls upstanding from said back and defining a shallow box of molded insulating material with an open front;
   at least one opening within said sidewalls for use as a cord passage having a respective internally adjacent cord grip configuration integrally molded with said back and said sidewalls;
   said cord grip configuration comprises a partial cylindrical surface extending from said opening into said box for accommodating a cord in an orientation substantially parallel to said box back and a front edge at an inner end of said partial cylindrical surface extending upwardly therefrom;
   and, in addition, the box comprises for said cord grip configuration an upper clamp of separately molded insulating material that is secured thereto for retention of a cord therein against said front edge;
   means for facilitating the fastening of the wiring device to the portable box comprising a pair of oppositely disposed fastener bosses, said at least one opening for use as a cord passage comprising a pair of openings oppositely disposed in diagonally opposite corners of said box and said fastener bosses are located in the other diagonally opposite corners of said box and said back has an additional one or more openings for optional use in fastening of the box to an underlying support; and
   each said opening encompasses more than one-half of the height of the sidewall in which it occurs.

4. A wiring device portable box for use with an electrical wiring device of the type having contact elements within a housing of molded insulating material otherwise separately usable for mounting on a surface, which portable box comprises:

a back and sidewalls upstanding from said back and defining a shallow box of molded insulating material with an open front;

at least one opening within said sidewalls for use as a cord passage having a respective internally adjacent cord grip configuration integrally molded with said back and said sidewalls;

said cord grip configuration comprises a partial cylindrical surface extending from said opening into said box for accommodating a cord in an orientation substantially parallel to said box back and a front edge at an inner end of said partial cylindrical surface extending upwardly therefrom;

and, in addition, the box comprises for said cord grip configuration an upper clamp of separately molded insulating material that is secured thereto for retention of a cord therein against said front edge;

means for facilitating the fastening of the wiring device to the portable box comprising a pair of oppositely disposed fastener bosses, said at least one opening for use as a cord passage comprising a pair of openings oppositely disposed in diagonally opposite corners of said box and said fastener bosses are located in the other diagonally opposite corners of said box and said back has an additional one or more openings for optional use in fastening of the box to an underlying support; and the portable box is fastened in combination with a wiring device that is a receptacle having four outlets in a shallow insulating housing.

5. A wiring device and wiring device portable box combination comprising:

an electrical wiring device having contact elements within a housing of molded insulating material otherwise separately usable for mounting on a surface in combination with a wiring device portable box in accordance with claim 58 wherein said device and said box are fastened together using said means for facilitating the fastening of the wiring device to the portable box.

6. A combination including a wiring device adapter plate for mounting to an electrical outlet box an electrical wiring device of the type having contacts for four outlets within a housing a molded insulating material having a mounting portion, which adapter plate comprises:

a major plate portion, of molded insulating material, substantially equal in area to the mounting portion of the wiring device;

first fastener means for facilitating the fastening of the wiring device to the major plate portion;

second fastener means for facilitating the fastening of the adapter plate to any of a plurality of electrical outlet box configurations including a single gang outlet box and a double gang outlet box; and a wiring device that is a receptacle having four outlets in a shallow insulating housing that is secured to the plate by the first fastener means.

* * * * *